United States Patent
Kelliher

(10) Patent No.: US 7,142,590 B2
(45) Date of Patent: *Nov. 28, 2006

(54) METHOD AND SYSTEM FOR OVERSUBSCRIBING A DSL MODEM

(75) Inventor: Timothy L. Kelliher, Alameda, CA (US)

(73) Assignee: UTStarcom Inc., Almameda, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 10/074,832

(22) Filed: Feb. 13, 2002

(65) Prior Publication Data

US 2003/0074214 A1    Apr. 17, 2003

Related U.S. Application Data

(60) Provisional application No. 60/328,648, filed on Oct. 11, 2001.

(51) Int. Cl.
    *H04B 1/38* (2006.01)
(52) U.S. Cl. ...................................... 375/222
(58) Field of Classification Search ............... 375/219, 375/220, 222, 377, 352, 401; 379/93.09; 709/250, 253
    See application file for complete search history.

(56) References Cited

U.S. PATENT DOCUMENTS

| | | | |
|---|---|---|---|
| 3,676,846 A * | 7/1972 | Busch ........................ | 714/749 |
| 4,112,264 A * | 9/1978 | Abramson et al. .......... | 714/712 |
| 4,393,492 A | 7/1983 | Bishop | |
| 4,730,311 A | 3/1988 | Carse et al. | |
| H1175 H | 4/1993 | Giorgio | |
| 5,260,937 A | 11/1993 | Eames et al. | |
| 5,390,239 A | 2/1995 | Morris et al. | |
| 5,668,857 A | 9/1997 | McHale | |
| 5,852,655 A | 12/1998 | McHale et al. | |
| 5,898,761 A | 4/1999 | McHale et al. | |
| 5,905,778 A | 5/1999 | Shires | |
| 5,923,671 A | 7/1999 | Silverman | |
| 5,991,311 A * | 11/1999 | Long et al. ................. | 370/524 |
| 6,005,873 A | 12/1999 | Amit | |
| 6,009,106 A | 12/1999 | Rustad et al. | |
| 6,014,431 A | 1/2000 | McHale et al. | |
| 6,061,392 A | 5/2000 | Bremer et al. | |
| 6,084,874 A | 7/2000 | Nguyen et al. | |
| 6,128,300 A * | 10/2000 | Horton ................... | 370/395.65 |
| 6,157,638 A * | 12/2000 | Tayloe et al. ............... | 370/358 |

(Continued)

FOREIGN PATENT DOCUMENTS

WO    WO 99/20033    4/1999

OTHER PUBLICATIONS

"X-Cel & GDSL System V.90 Rls@ Analog Modem Support," GoDigital Networks-Technical Note, 7 pages, Jan. 23, 2001.

(Continued)

*Primary Examiner*—Young T. Tse
(74) *Attorney, Agent, or Firm*—McDonnell Boehnen Hulbert & Berghoff LLP

(57) ABSTRACT

M DSL Modems provide DSL service to N Customer Premise Equipment devices, wherein M is less than N. P OAM/EOC Modems maintain active DSL lines for the N−M=P Customer Premise Equipment devices not receiving DSL service. The OAM/EOC Modems communicate synchronization data via superframes with the P Customer Premise Equipment Devices. Requests to send and receive data are embedded within the superframes. A switch in communication with the DSL Modems and OAM/EOC Modems connects the DSL Modems and OAM/EOC Modems to respective Customer Premise Equipment devices in response to the requests to send and receive data.

14 Claims, 9 Drawing Sheets

U.S. PATENT DOCUMENTS

| | | | |
|---|---|---|---|
| 6,160,808 | A | 12/2000 | Maurya |
| 6,160,843 | A | 12/2000 | McHale et al. |
| 6,169,788 | B1 | 1/2001 | McHale et al. |
| 6,198,749 | B1 | 3/2001 | Hui |
| 6,282,273 | B1 * | 8/2001 | McHale et al. .......... 379/93.28 |
| 6,324,212 | B1 | 11/2001 | Jenness |
| 6,349,123 | B1 | 2/2002 | Kim |
| 6,373,852 | B1 | 4/2002 | Foladare |
| 6,373,860 | B1 * | 4/2002 | O'Toole et al. ............. 370/493 |
| 6,385,203 | B1 * | 5/2002 | McHale et al. ............. 370/401 |
| 6,477,595 | B1 * | 11/2002 | Cohen et al. ................ 710/105 |
| 6,671,287 | B1 * | 12/2003 | Huttunen et al. ........... 370/469 |
| 6,724,849 | B1 * | 4/2004 | Long et al. ................. 375/371 |
| 6,741,599 | B1 * | 5/2004 | Dunn et al. ............... 370/395.6 |
| 6,744,883 | B1 * | 6/2004 | Bingel et al. .......... 379/399.01 |
| 6,798,769 | B1 * | 9/2004 | Farmwald .................. 370/352 |
| 6,804,267 | B1 * | 10/2004 | Long et al. ................. 370/524 |
| 2001/0043568 | A1 * | 11/2001 | McHale et al. ............. 370/254 |
| 2003/0074480 | A1 * | 4/2003 | Kelliher ...................... 709/253 |

OTHER PUBLICATIONS

"Connection Optimized Link Technology," White paper, Ramp Networks, 6 pages, (1998).

"Powerful Internet and Remote Access Platform," WebRamp 361i, 2 pages, Mar. 2000.

"Dualing Modems Reach 112K," WIred News, 3 pages, Feb. 3, 2000.

"SupraSonic Dual Modem: Twice is Nice," PCWorld.com, 3 pages, Jul. 27, 1998.

"Copper Edge 200 RT DSL Concentrator," 4 pages, Aug. 2001.

"Multi-Tenant Unit Profitability Analysis," 10 pages, Dec. 2000.

U.S. Appl. No. 10/159,496, filed May 31, 2002, Kelliher.

* cited by examiner

METHOD AND SYSTEM FOR OVERSUBSCRIBING A DSL MODEM

This application claims the benefit of U.S. Provisional Application No. 60/328,648, filed Oct. 11, 2001, which is hereby incorporated by reference.

BACKGROUND

Typically a DSL network comprises a plurality of customer premise equipment (CPE) devices connected to a DSLAM (Digital Subscriber Line Access Multiplexer) via a bundle of twisted-pair wires. FIG. 1 illustrates such a prior art DSL network. The DSLAM is also connected to a network for sending and receiving data to and from the respective CPE. The DSLAM may further be connected to other devices, such as routers, for directing and switching data through the DSL network. A DSLAM comprises a plurality of DSL modems which may be implemented in software residing on one or more Digital Signals Processors (DSP). The customer premise equipment may include a variety of devices such as modems and handsets. By way of example the customer premise equipment of FIG. 1 comprise DSL modems capable of communicating with the DSLAM.

Each of the N CPE DSL modems of FIG. 1 are connected directly to a respective DSL modem in the DSLAM via a dedicated twisted-pair conductor, or POTS (Plain Old Telephone Service) line. The twisted-pair conductors are usually part of the public switched telephone network (PSTN). Typically these lines are supplied in bundles of 25 twisted-pair conductors per bundle. There may be greater or fewer twisted-pair conductors per bundle. For example, a typical DSLAM may supply DSL service at VDSL data rates to 25 DSL modems located at the customer end. VDSL data rates are up to 26 Mbps (Megabits per seconds) upstream and downstream. Other forms of DSL service having different data rates may also be supplied such as ADSL (up to 1.5 Mbps upstream, 8 Mbps downstream), SHDSL (up to 4 Mbps upstream and downstream), and HDSL (1.5 Mbps upstream and downstream).

High speed dedicated DSL service as described above has many disadvantages. For example, with 25 DSL modems at the customer end, and with each dedicated line capable of carrying data at a rate of 1.5 Mbps, the DSLAM must be able to process data at a rate of 37.5 Mbps. Such high data rate requirements typically require a pool of high speed, and expensive digital signal processors. In addition to the expense, the large number of high speed DSPs require large amounts of power, which is frequently in short supply at some of the remote locations that the DSLAMs may be located in.

Furthermore, while dedicated DSL service is supplied to the customer, it is often not needed. Most customer's DSL modems sit idle through much of the day and night. For example, for the most part the customer's DSL modem is not being used while the customer is away at work, or asleep. This represents the majority of the day, even for heavy home computer users. Additionally, even when a customer is using their computer and DSL modem, the DSL communications tend to be bursty. That is, a user might need or want a large amount of bandwidth to download or upload files, but once the file transfers have completed the DSL line servicing the customer might carry only a small amount of data for comparatively long periods of time while the customer uses their computer to view files, write letter, etc.

Thus a need presently exists for a system and method to supply DSL service to customers in a more intelligent, cost effective, and efficient way.

SUMMARY

By way of introduction, the preferred embodiments below provide a method and system for oversubscribing a DSL modem. The system is installed between at least one upstream data link and a plurality of downstream data links. Each downstream data link is coupled to a respective customer premise equipment device. The system comprises M DSL modems connected to the at least one upstream data link, P OAM/EOC modems in communication with the M DSL modems, and a switch, or multiplexer, connected to the N downstream data links. The switch connects the M DSL modems and the P OAM/EOC modems to the N downstream data links thereby allowing communication between the DSL and OAM/EOC modems and the customer premise equipment devices. Various embodiments of the system comprising analog multiplexers, digital multiplexers, and Time Division Multiplexed switches are disclosed.

The M DSL modems are connected to a first set of M customer premise equipment devices, and the P OAM/EOC modems are connected to a first set of P customer premise equipment devices. User traffic data is transferred between the M DSL modems and the first set of M customer premise equipment devices. Synchronization data is transferred between the P OAM/EOC modems and the first set of P customer premise equipment devices. In response to requests to send and receive data the M DSL modems are connected to a second set of M customer premise equipment devices, and the P OAM/EOC modems are connected to a second set of P customer premise equipment devices. Requests to send and receive data are embedded within superframes. User traffic data and synchronization data is transferred between the modems and the second sets of customer premise equipment devices. The first and second sets of customer premise equipment devices are selected such that at least some customer premise equipment devices that did not receive DSL service as part of the first set receive DSL service as part of the second set.

The foregoing paragraphs have been provided by way of general introduction, and they should not be used to narrow the scope of the following claims. The preferred embodiments will now be described with reference to the attached drawings.

DETAILED DESCRIPTION OF THE PRESENTLY PREFERRED EMBODIMENTS

System Overview

Figure 1:
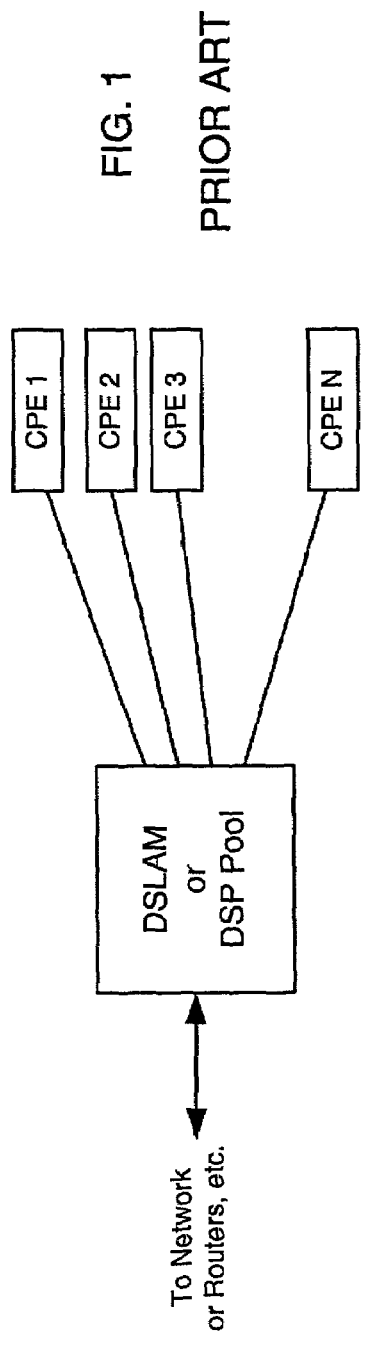
FIG. 1 is a prior art DSL network.
Figure 2:
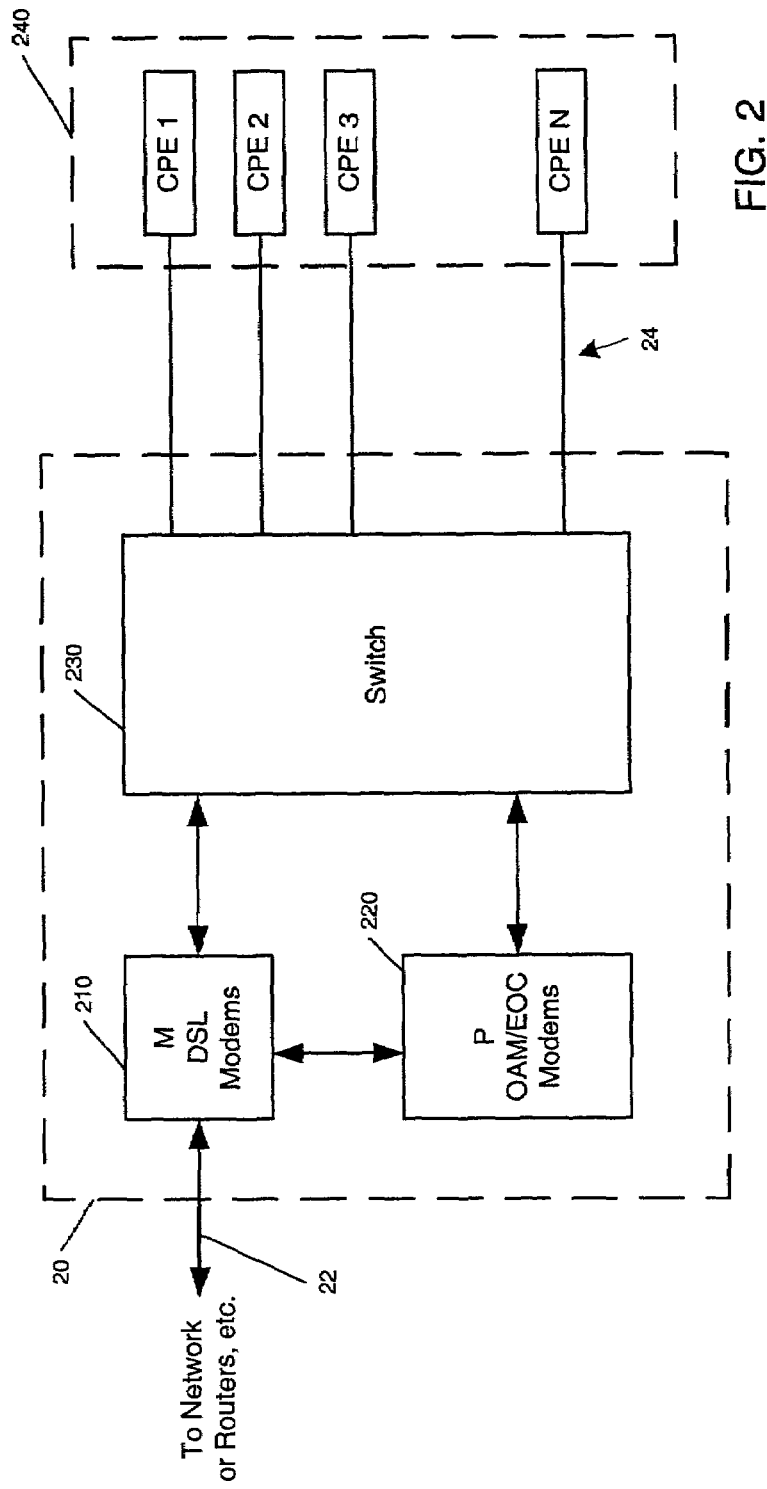
FIG. 2 is a system for oversubscribing a DSL modem of the present invention.

FIG. 2 illustrates a preferred embodiment of a system for oversubscribing a DSL modem. The DSL modem switching system 20 comprises a switch 230, M DSL modems 210, and P OAM/EOC (Operation Administration Maintenance/Embedded Operations Channel) modems 220. The switching system 20 is connected between at least one upstream data link 22 and a plurality of N downstream data links 24. Each downstream data link is coupled to respective customer premise equipment devices 240. The upstream data links 22 may comprise, for example, a POTS line, optical fiber, a twisted pair conductor, the public switched telephone network, a T1 connection, a T3 connection, an ISDN connection, coaxial cable, an SHDSL link, an ADSL link, a VDSL link, an HDSL link, a V.90 link, an OCn link, and the like. The downstream data links 24 preferably comprise POTS lines, but may also include coaxial cable. The terms "POTS lines" and "twisted pair conductors" are used interchangeably.

The M DSL modems 210 provide DSL service, including the transfer of user traffic data, between the upstream data links 22 and M of the N customer premise equipment devices 240 via the downstream data links 24. User traffic data includes e-mail, software downloads and updates, web pages, audio and video files, data for maintaining a user's computer on a network, and the like. The P OAM/EOC modems maintain active DSL lines by communicating synchronization data to P of the N customer premise equipment devices 240 via the downstream data links 24. The terms "active DSL lines" and "synchronized DSL lines" are intended broadly to mean that a link and a CPE device connected to the link remains in a state as if the link and CPE device were connected to a DSL modem.

By maintaining active and synchronized DSL lines and CPE devices even when user traffic data is not being transferred, the time between when communication is requested to or from a CPE device to when communication actually begins is very small, on the order of 17 ms. 17 ms represents the length of one ADSL superframe.

In contrast if the lines are not kept active, that is synchronization of the superframes is lost, the time between when communication is requested to or from a CPE to when communication actually begins can be on the order of 3 to 15 seconds. This substantial time delay is due in part to the overhead required to set up an active DSL line.

Typically both the user traffic data and the synchronization data are communicated via superframes. Superframes are defined in standards ANSI T1.413-1998 and ITU G.992.2, both of which are hereby incorporated by reference. The superframes communicated by the P OAM/(EOC modems carry very little user traffic data and thus have bandwidth requirements only a fraction of that of superframes communicated by the M DSL modems.

The OAM/EOC modems process around 32 Kbps per channel at a minimum for ADSL or VDSL and are responsible for monitoring and acting on the OAM and EOC channels in the DSL superframe. Thus the bandwidth overhead for the OAM/EOC channels to maintain all active lines is very small. In contrast, the bandwidth requirements of each of the DSL modems is up to around 8 Mbps for ADSL or 26 Mbps for VDSL. So an OAM/EOC modem need only be able to process less than about 1% of the bandwidth of a DSL modem. OAM/EOC channels are described in detail in ANSI T1.413-1998.

The Switch 230 connects the M DSL modems 210 and the P OAM/EOC modems 220 to respective customer premise equipment devices 240 via the downstream data links 24. The switch 230 is reconfigured in response to requests to send and receive user traffic data to and from the N customer premise equipment devices 240, thus providing DSL service to a set of M customer premise equipment devices and maintaining active DSL lines to the remaining P customer premise equipment devices.

Requests to send and receive user traffic data are communicated between the DSL modems 210, the OAM/EOC modems 220, and the customer premise equipment devices 240 via Request-to-Send (RTS) and Clear-to-Send (CTS) signals. Preferably, the RTS/CTS signals are embedded within superframes. RTS and CTS signals are discussed in detail in U.S. patent application "System for Enhancing Data Transfer", Inventor Michael Farmwald, Filing Date Sep. 13, 2001, U.S. Pat. No. 6,798,769 B1, which is hereby incorporated by reference.

Figure 3:
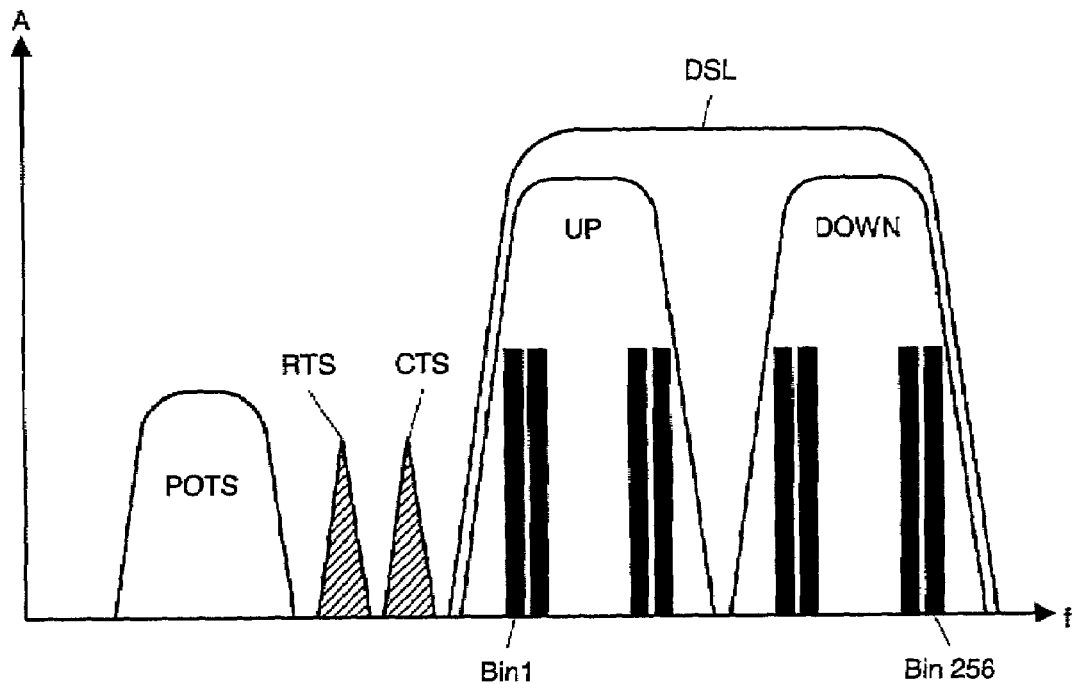
FIG. 3 is a diagram illustrating the frequency band assignments available for DSL communications.

FIG. 3 illustrates the frequency band assignments available for DSL communications. POTS (Plain Old Telephone Service) and DSL are available for all types of DSL communications. The DSL communications band is made up by at least two up and down sub-frequency bands. Each sub-band is divided into frequency bins. In the current example there are 256 bins but there may be more or less depending on the DSL implementation. The bits of the bins are reassembled to form superframes.

Figure 4:
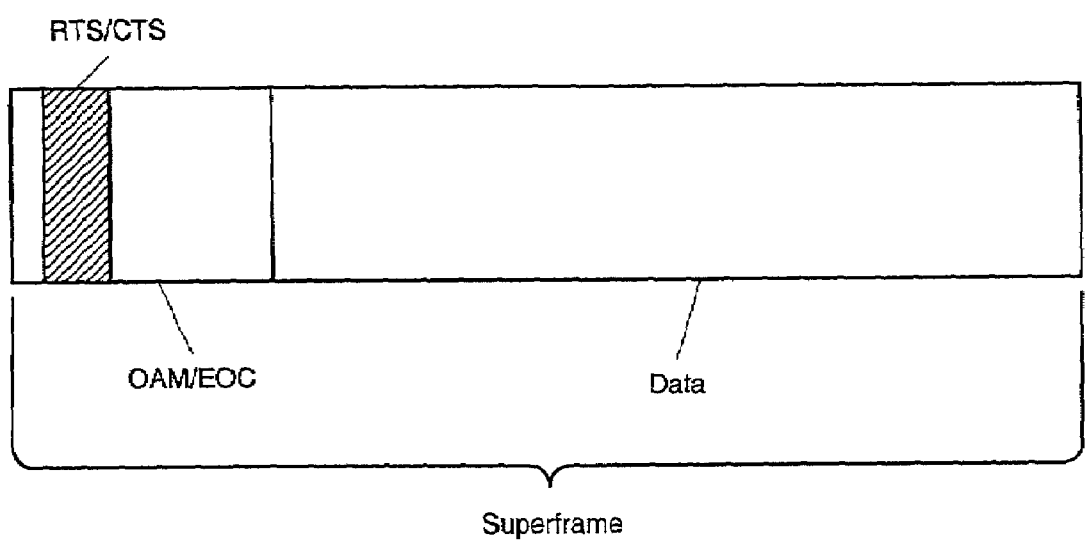
FIG. 4 is an illustration of the components of an exemplary DSL superframe.

FIG. 4 illustrates the components of a superframe. The majority of the superframe contains a data part, the part used to transport data such as user traffic data. The rest of the superframe is used to manage a DSL link via the OAM/EOC channel. The OAM/EOC channel contains various types link management information such as described in ANSI T1.413-1998.

Referring back to FIG. 3, RTS and CTS signals are shown outside the DSL band. This is one method to communicate RTS and CTS signals. A preferred method used by the present invention embeds the RTS and CTS signals within the OAM/EOC channels as shown in FIG. 4. A preferred method of embedding RTS/CTS into the OAM channel is by utilizing indicator bits that are currently unused in the superframe. For example, indicator bits 0 through 7 can be used in an ADSL superframe to communicate RTS/CTS signals. Section 6.4 of ANSI T1.413-1998 describes the use of indicator bits in an ADSL superframe. RTS/CTS can also be embedded in the EOC channel as an EOC command set as defined in section 8 of ANSI T1.413-1998.

Embedding RTS and CTS within the OAM/EOC channels has the advantage of requiring only software changes to communicate RTS and CTS signals. The communication of out-of-band RTS and CTS signals requires software as well as hardware changes, including, at a minimum, filters to filter out only that part of the spectrum that contains the RTS and CTS signals. Software changes to put RTS/CTS signals in-band utilizing the aforementioned bits or equivalents are within the scope of those skilled in the art.

When CTS is deasserted for an individual CPE device the entire DSL superframe continues to be transferred with the CPE device. However substantially no user traffic is carried by the superframe when the link is scaled to IDLE mode following CTS deassertion. As a result, the unused bandwidth can be assigned to another CPE DSL link that requests a data transfer. In other words, the switch 230 of FIG. 2 disconnects a DSL Modem 210 from a CPE device when CTS is deasserted and connects that modem to a CPE device requesting service. Simultaneously, an OAM/EOC modem 220 is connected to the CPE device for which CTS was deasserted and superframes for maintaining synchronization are transmitted.

The switch 230 can be implemented in the analog or digital domain and is preferably capable of connecting any of the M DSL modems 210 and P OAM/EOC modems 220 to any of the N customer premise equipment devices 240 via the downstream data links 24. It is well understood by those skilled in the art how to construct such switches and many actual physical implementation of the switch, as well as of the other components of the DSL modem switching system 20, can be used while remaining within the scope and nature of the inventions disclosed herein.

The switch 230 is controlled by the DSL modems 210 and the OAM/E0C modems 220 to allow communications and maintain synchronization between the CPE devices 240 and the modems 210, 220. The OAM/E0C modems and DSL modems are also in communication with each other. The customer premise equipment, for example, comprises a plurality of DSL modems capable of forming and maintaining communications with the DSL modems 210 and the OAM/EOC modems 220.

Both the DSL modems 210 and the OAM/EOC modems 220 are preferably implemented in software on a DSP. Furthermore both the OAM/EOC modems 220 and the DSL modems 210 may be implemented on the same DSP and may include various filtering and control functions necessary for successful DSL communications.

Because of the low bandwidth requirements of the OAM/EOC modems many OAM/EOC modems can easily and inexpensively be implemented on a single DSP. For example, for 25 CPE DSL modems, the OAM/EOC modems, or the equivalent DSPs on which the modems are implemented need only be able to process around 800 kbps to keep all 25 CPE DSL lines active. Many modem DSPs, such as the Altera Nios, are suitable for implementing modems.

Oversubscribing a DSL Modem

The preferred embodiments described in this section present a method for oversubscribing a DSL modem. As used here, "oversubscribed" is intended broadly to mean the ability to provide DSL service to N customers using less than N DSL modems. Additional "Oversubscribing a DSL Modem" is intended broadly to cover oversubscribing one or more DSL modems, as the methods discussed apply equally to one or more DSL modems.

N CPE devices are provided DSL service, including transferring user traffic data, from M DSL modems, where M is less than N. For example 25 CPE devices may receive DSL service from 5 DSL modems. Varying numbers of DSL modems from 1 to 1-N may provide service to the N CPE devices.

Synchronization is maintained for the CPE devices not receiving DSL service via P OAM/EOC modems. Thus, M+P=N where $P \geqq 1$. So, if there are 25 CPE devices and 5 DSL modems, then there are 15 OAM/EOC modems for maintaining DSL synchronization, via the transfer of synchronization data, with the 15 CPE devices not being provided DSL service by the 5 DSL modems.

Oversubscribing a DSL modems includes connecting M DSL modems to a first set of M CPE device and connecting P OAM/EOC modems to a first set of P customer premise equipment devices. That is, each DSL modem is connected to a CPE device and each OAM/EOC modem is connected to a CPE device. Once connected, user traffic data is transferred between the M DSL modems and the first set of M CPE device, and synchronization data is communicated between the P OAM/EOC modems and the first set of P CPE device.

User traffic data continues to flow between the M DSL modems and M CPE devices until either there is no more data to transmit and receive between each respective M DSL modem and M CPE device no-more-data condition), or until a time-out period has expired (time-out condition). Time-Outs are necessary to prevent bandwidth greedy customers from monopolizing bandwidth. A greedy customer is allotted a fixed or varying amount of time during which the greedy customer can transmit and receive data. Once the time period has elapsed, the bandwidth allocated to the greedy customer is made available to subsequent customers. The bandwidth may be reassigned back to the greedy customer after the subsequent customers either complete their data transactions or times-out. In this manner, high quality service is afforded to all customers during heavy network usage times.

Upon a no-more-data or time-out event, the M DSL modems are connected to a second set of M CPE device, and the P OAM/EOC modems are connected to a second set of P CPE devices. At least some of the devices comprising the second set of M CPE devices are devices that were members of the first set of P CPE devices. In other words, at least some CPE devices that were not receiving DSL service as part of the first set are connected such as to enable DSL service as part of the second set. Equivalently, at least some of the second set of P CPE devices are members of the first set of M CPE devices thereby ensuring active DSL connections when DSL service is switched away from a device that was receiving service as part of the first set.

Once the switchover from the first set of connections to the second set of connections are completed, user traffic data is transferred between the M DSL modems and the second set of M CPE devices, and synchronization data is transferred between the P OAM/E0C modems and the second set of P CPE devices. It should be further noted that if a time-out or a no-more-data condition for an individual CPE device does not occur, those individual CPE devices of the first set may continue to receive uninterrupted DSL service, and thus become part of the second set of M CPE devices. Third, fourth, and additional sets of connections are made thereby allowing all CPE devices to receive DSL service.

Request to send and receive data, such as RTS/CTS signals, are transferred between the N CPE devices and the DSL and OAM/EOC modems. The requests are preferably embedded within superframes. In accordance with the requests, connections between the modems and the first, second, and subsequent sets of CPE devices are made.

Since there are less DSL modems than there are CPE devices there will occasionally be more requests for DSL service than there are DSL modems available to provide service. In establishing which CPE devices to provide DSL service, a First Come First Served method is employed. That is, the CPE devices first to request service will be first to receive service. It is also advantageous to be able to employ priority queuing schemes so that, for example, those customers paying more for DSL service receive more access to the available bandwidth. That is, their requests for service take precedence over those requests having a lower priority. An algorithm suitable for queuing multiple requests of varying priorities is Weighted Fair Queuing. Other algorithms well understood by those skilled in the art may be used. Additionally, the priorities may be associated with the time-out conditions introduced above so that customers with a higher priority will have longer time-out periods than those with a lower priority.

Thus oversubscribing a DSL modem comprises the following steps:

1. According to priority and order of request, connect each CPE device to either a DSL modem or an OAM/E0C modem;

2. For each CPE device, if connected to a DSL modem, transfer user traffic data; otherwise if connected to an OAM/E0C modem, transfer synchronization data;

3. For each CPE device connected to a DSL modem, check for time-out or no-more-data condition;

a) if condition does not exist go to step 2.

b) if condition does exist go to step 1.

Step 1 can employ a First Come First Served algorithm, a Weighted Fair Queuing algorithm, or any other algorithm for request handling available to those skilled in the art. Requests for DSL service are communicated via OAM/EOC in-band RTS/CTS signals. Accordingly, synchronization data comprises a superframe, and the superframe comprises embedded RTS/CTS signals. The time-out condition of Step 3 can employ a priority scheme whereby CPE devices having a higher priority have longer time-out periods than those CPE devices with a lower priority. In transferring control from Step 3b to Step 1 some CPE devices connected to DSL modems may retain their connections inasmuch as no time-out or no-more-data condition has occurred for those devices. In retaining their connections, the devices continue to receive uninterrupted DSL service. Simultaneously, other CPE devices connected to DSL modems may be reconnected to OAM/EOC modems.

Figure 5A:
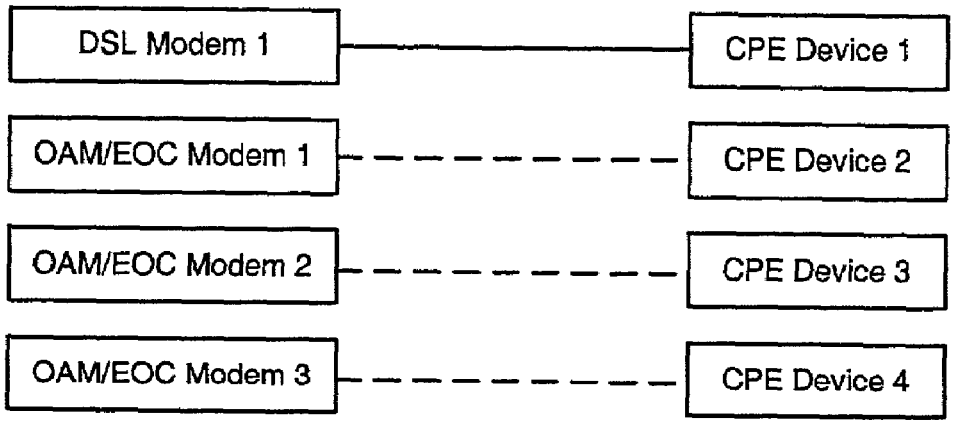
FIGS. 5A–C illustrate a method of a preferred embodiment for oversubscribing a DSL modem.
Figure 5B:
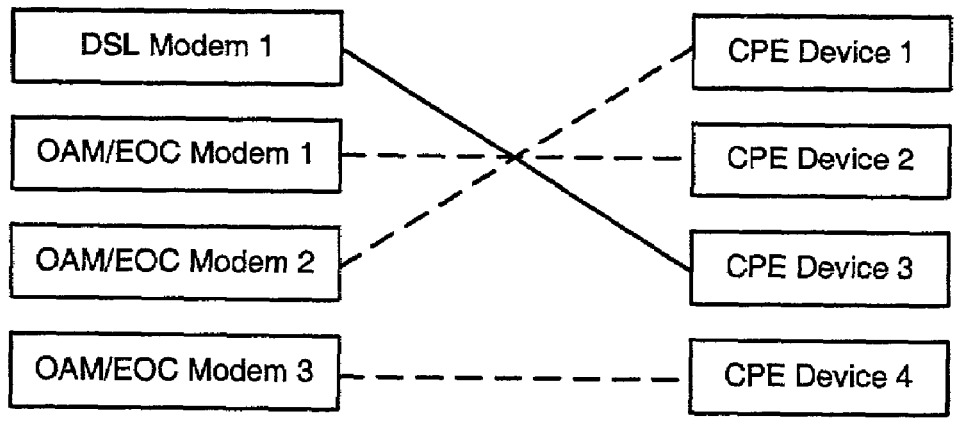
Figure 5C:
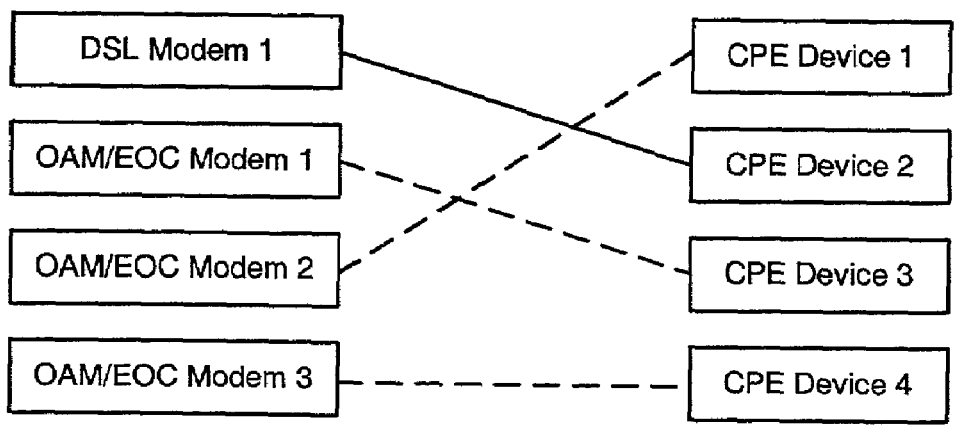

FIGS. 5A–C further illustrate the above detailed method for oversubscribing a DSL modem. In this example, M=1, P=3, and N=4, although other values for M, P and N may be used. The solid and dashed lines indicate connection, either direct or indirect, between the modems and the CPE devices.

FIG. 5A shows DSL modem 1 providing DSL service to CPE Device 1. OAM/EOC modems 1, 2 and 3 provide synchronization data to CPE Device 2, 3 and 4 respectively, for maintaining active DSL lines. Through a time-out or a no-more-data condition, DSL service is removed from CPE Device 1 and provided to CPE Device 3, as shown in FIG. 5B. CPE Device 3 receives DSL service ahead of the other CPE devices because at least one of the following conditions occur: CPE Device 3 was the first to request service, CPE Device 3 was the highest priority device to request service, or CPE Device 3 was the only device to request service. Additionally, OAM/EOC modem 2 is connected to CPE Device 1 to maintain an active DSL line. The other OAM/EOC modems remain connected to respective CPE Devices for maintaining synchronization. In FIG. 5C, after a time-out or a no-more-data condition, DSL service is removed from CPE Device 3 and provided to CPE Device 2. In order to maintain an active DSL line a connection is made between OAM/EOC modem 1 and CPE Device 3.

The above illustrates, for M CPE devices, a single DSL modem providing M DSL service to a single CPE device. That is, there is a one-to-one correspondence between the number of DSL modems the number of CPE devices receiving DSL service. The above methods are equally applicable when providing DSL service to an individual CPE device though two or more DSL modems simultaneously.

Specific Embodiments

Figure 6:
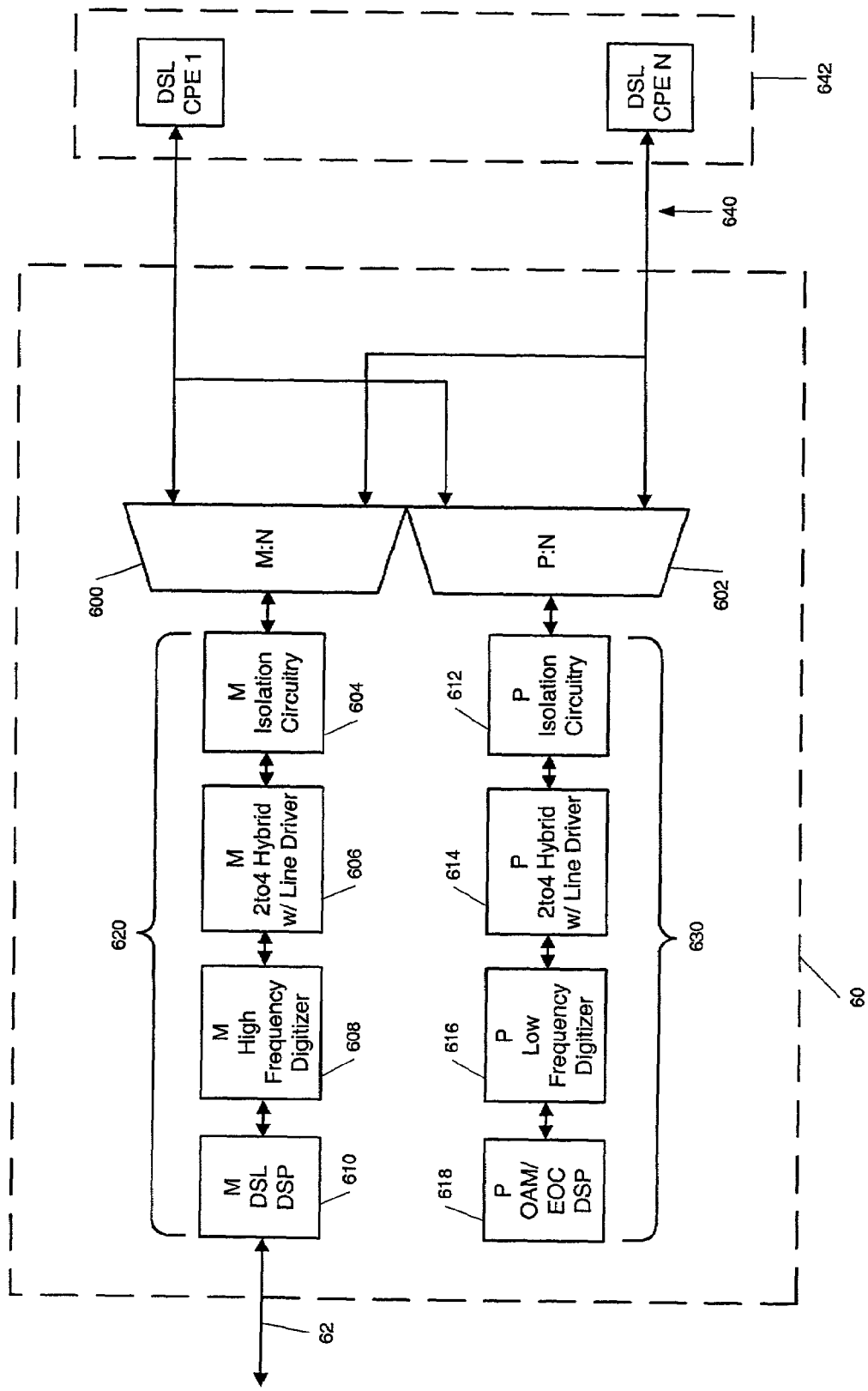
FIG. 6 is a system for oversubscribing a DSL modem of the present invention comprising high voltage analog multiplexers between CPEs and isolation circuitry.

Turning now to FIG. 6, a preferred analog implementation of a system for oversubscribing a DSL modem is shown. The DSL modem switching system 60 comprises an M:N analog multiplexer 600 connected to N downstream data links 640, and a P:N analog multiplexer 602 connected to the N downstream data links 640, where M+P=N, P≧1. The M:N analog multiplexer 600 is coupled to a DSL DSP path 620. The DSL DSP path 620 is further coupled to at least one upstream data link 62. The P:N analog multiplexer 602 is coupled to an OAM/EOC DSP path 630.

The DSL DSP path 620 comprises M DSL DPSs 610 connected to the at least one upstream data link 62, M High Frequency Digitizers 608 in communication with the M DSL DSPs 610, M 2 to 4 Hybrids with Line Drivers 606 in communication with the M High Frequency Digitizers 608, and M Isolation Circuitry 604 in communication with the M 2 to 4 Hybrids with Line Drivers 606 and the M:N analog multiplexer 600.

The OAM/EOC DSP path 630 comprises P OAM/EOC DSPs 618, P Low Frequency Digitizers 616 in communication with the P OAM/EOC DSPs 618, P 2 to 4 Hybrids with Line Drivers 614 in communication with the P Low Frequency Digitizers 616, and P Isolation Circuitry 612 in communication with the P 2 to 4 Hybrids with Line Drivers 614 and with the P:N analog multiplexer 602.

In this particular implementation the multiplexers 600, 602 are situated such that they are in direct communications with the isolation circuitry 604, 612, and N CPE devices 642, via the downstream data links 640. This implementation minimizes common circuitry, that is any circuitry interposed between the multiplexers and the downstream data links. Minimizing common circuitry allows for price performance optimization of the data processing circuitry. The data processing circuitry includes the OAM/EOC DSP path and the DSL DSP path. Since the analog multiplexers 600, 602 are coupled to the downstream data links 640 which, for example, may be the POTS lines, this particular implementation puts high voltage requirements on the analog multiplexers 600, 602. Also, this implementation, puts the analog multiplexers 600, 602 in the high power path, before the line drivers 606, 614. Therefore, typically, the analog multiplexers 600, 602 must be capable of handling around 1 watt per channel.

Figure 7:
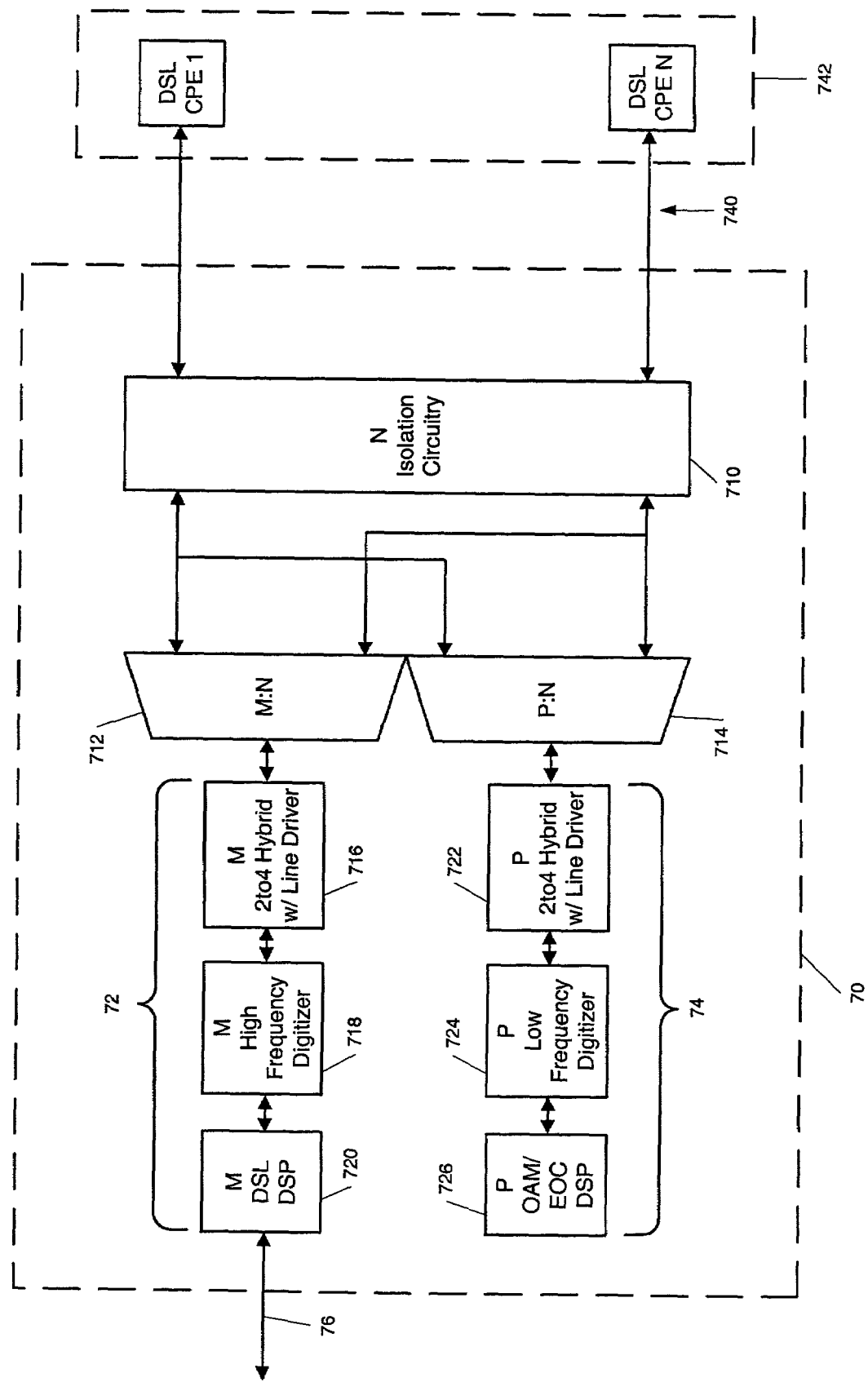
FIG. 7 is a system for oversubscribing a DSL modem of the present invention comprising low voltage analog multiplexers between hybrids and isolation circuitry.

FIG. 7 shows an alternative analog implementation of a system for oversubscribing a DSL modem. The DSL modem switching system 70 comprises an M:N analog multiplexer 712 and a P:N analog multiplexer 714, where M+P=N, P≧1. The M:N analog multiplexer is in communication with a DSL DSP path 72, and the DSL DSP path 72 is in communication with at least one upstream data link 76. The P:N analog multiplexer is in communication with an OAM/EOC DSP path 74. Both multiplexers 712, 714 are in communication with N isolation circuitry 710, which is in communication with N CPE devices 742 via downstream data links 740.

The DSL DSP path 72 comprises M DSL DSPs 720 connected to the at least one upstream data link 76, M High Frequency Digitizers 718 in communication with the M DSL DSPs 720, and M 2 to 4 Hybrids with Line Drivers 716 in communication with the M High Frequency Digitizers 718 and the M:N analog multiplexer 712.

The OAM/EOC DSP path 74 comprises P OAM/EOC DSPs 726, P Low Frequency Digitizers 724 in communication with the P OAM/EOC DSPs 726, and P 2 to 4 Hybrids with Line Drivers 722 in communication with the P Low Frequency Digitizers 724 and with the P:N analog multiplexer 714.

Due to the placement of the isolation circuitry 710, the implementation of FIG. 7 allows the analog multiplexers 712, 714 to work at low voltages. Expensive common circuitry is minimized. Power requirements of the multiplexers 712, 714 are high meaning that the amount of power that must pass through the multiplexers is high.

Figure 8:
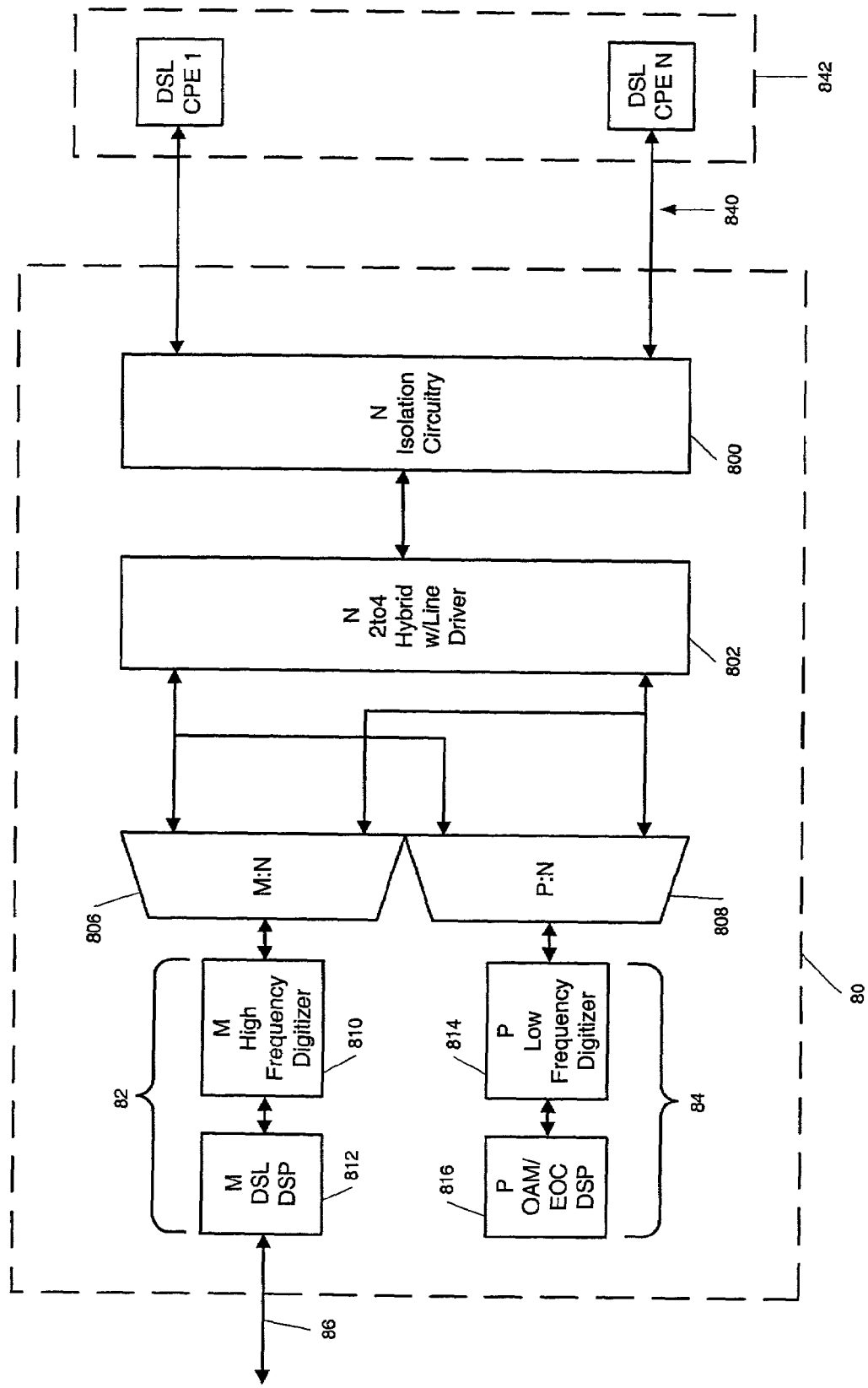
FIG. 8 is a system for oversubscribing a DSL modem of the present invention comprising low voltage analog multiplexers between digitizers and hybrid circuitry.

FIG. 8 shows another alternative analog implementation of a system for oversubscribing a DSL modem. The DSL modem switching system 80 comprises N isolation circuitry 800 coupled to N CPE devices 842 via downstream data links 840. The isolation circuitry in turn is coupled to N 2 to 4 Hybrids with Line Drivers 802 which in turn is coupled to an M:N analog multiplexer 806 and a P:N analog multiplexer 808. A DSL DSP path 82 is in communication with the M:N analog multiplexer 806 and at least one upstream data link 86. The DSL DSP path 82 comprises M High Frequency Digitizers 810 coupled to the M:N analog multiplexer 806, and M DSL DSPs 812 coupled to the M High Frequency Digitizers 810 and the at least one upstream data link 86. Similarly an OAM/EOC path comprises P OAM/EOC modems 816, and P Low Frequency Digitizers 814 coupled to the P:N multiplexer 808 and with the P OAM/EOC DSPs 816.

By placing the analog multiplexers 806, 808 after the Hybrids with Line Drivers 802, the implementation detailed in FIG. 8 removes the high voltage and power requirements from the multiplexers, but increases the cost of the common circuitry as it requires that every line driver be DSL capable. A DSL capable line driver is one that has a Gain Bandwidth product comparable to the DSL power spectral density mask and has the appropriate output impedance. For ADSL, the line driver has to be capable of −32 dBm across a 1 MHz bandwidth and have an output impedance of about 200 ohms. A VDSL line driver has to be capable of −60 dBm across an 8.5 MHz bandwidth and have an output impedance of 100 ohms. In contrast, an ADSL OAM/EOC line driver needs to be capable of −32 dBm across a 350 KHz bandwidth, and a VDSL OAM/EOC line driver has to be capable of −60 dBm across a 4 MHz bandwidth. Also, the output power for an OAM/EOC line driver can potentially be reduced to, for example, −60 dBm for ADSL and −70 dBm for VDSL. The actual minimum output power is dependent on the transmission line characteristics.

Figure 9:
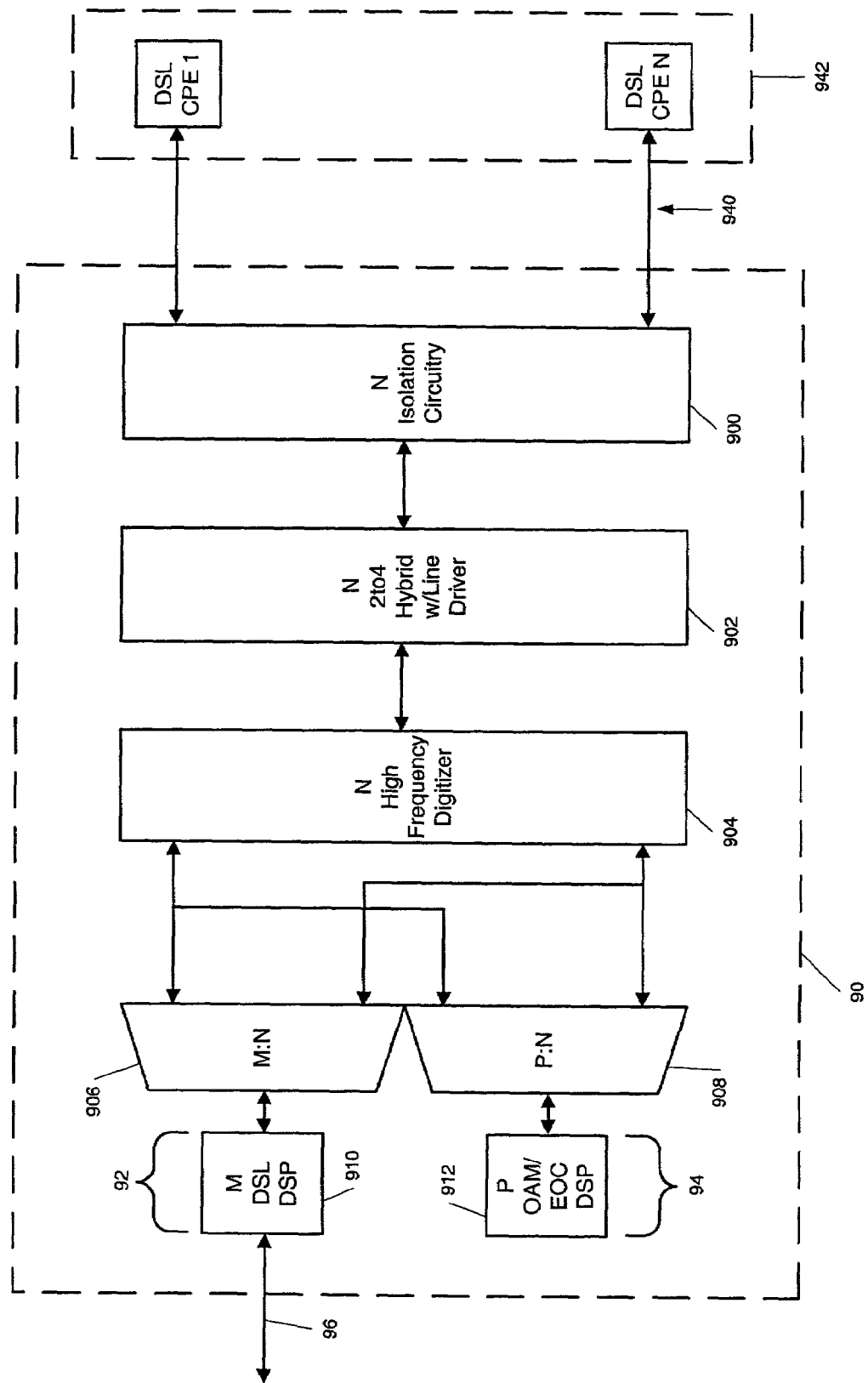
FIG. 9 is a system for oversubscribing a DSL modem comprising digital multiplexers.

FIG. 9 show a digital implementation of a system for oversubscribing a DSL modem. DSL switching system 90 comprises N Isolation Circuitry 900 in communication with N CPE devices 942 via downstream data links 940, N 2 to 4 Hybrids with Line Drivers 902 in communication with the N Isolation Circuitry 900, N High Frequency Digitizers 904 in communication with the N 2 to 4 Hybrids with Line Drivers 902, and an M:N digital multiplexer 906 and a P:N digital multiplexer 908 each in communication with the N High Frequency Digitizer 904. A DSL DSP path 92 is in communication with the M:N digital multiplexer 906 and with at least one upstream data link 96. The DSL DSP path 92 comprises M DSL DSP modems 910 connected to the at least one upstream data link 96 and the M:N digital multiplexer 906. An OAM/EOC DSP path 94 is in communication with the P:N digital multiplexer 908. The OAM/EOC DSP path 94 comprises P OAM/E0C DSPs 912 in communication with the P:N digital multiplexer 908. As in the previous embodiments the relationship between the ports of the M:N and P:N digital multiplexers 906, 908 respectively is M+P=N, P≧1.

This implementation while requiring the highest performance from the common circuitry is very inexpensive and reliable due in part to the relative simplicity of digital multiplexers.

Figure 10:
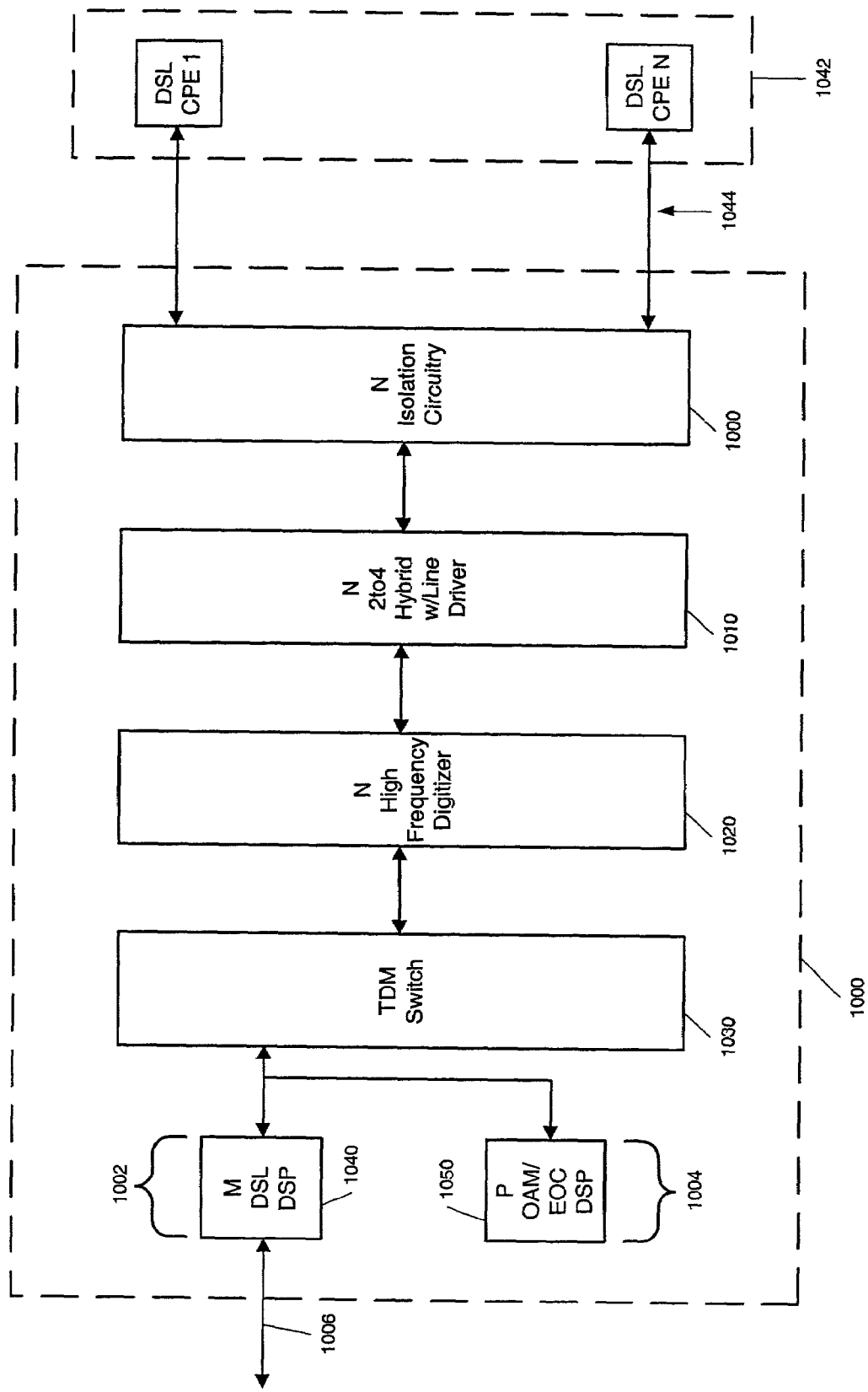
FIG. 10 is a system for oversubscribing a DSL modem comprising a Time Division Multiplexed switch.

Another embodiment of a system for oversubscribing a DSL modem is shown in FIG. 10. The DSL switching system 1000 comprises a Time Division Multiplexed (TDM) Switch 1030, N High Frequency Digitizers 1020 in communication with the TDM Switch 1030, N 2 to 4 Hybrids with Line Drivers 1010 in communication with the N High Frequency Digitizers 1020, N Isolation Circuitry 1000 connected to N CPE devices 1042, via N downstream data links 1044, and in communication with the N 2 to 4 Hybrids with Line Drivers 1010. A DSL DSP path 1002 and an OAM/EOC path 1004 are both in communication with the TDM Switch 1020. The DSL DSP path 1002 is in further communication with at least one upstream data link 1006. The DSL DSP path 1002 comprises M DSL DSPs 1040 in communication with the TDM switch 1030 and connected to the at least one upstream data link 1006. The OAM/EOC DSP path 1004 comprises P OAM/EOC DSPs 1050 in communication with the TDM Switch 1030.

This foregoing implementation while being the simplest is the most expensive of the embodiments described above to implement. The design and use of TDM switches is well understood by those skilled in the art.

In all of the foregoing implementations the DSL modems are preferably implemented as software on one or more DSPs but may be implemented using any combination of suitable software or hardware. Many types of DSL modems, compatible with many different protocols, can be implemented. By way of example, some of the DSL implementation include but are not limited to ADSL for both DMT (Discrete Multi-Tone Modulation) or QAM (Quadrature Amplitude Modulation), and VDSL (DMT or QAM). The data types that the modems transfer over the link are independent of the implementation. Therefore IP, ATM or any other framing protocol is compatible with present invention.

Figure 11:
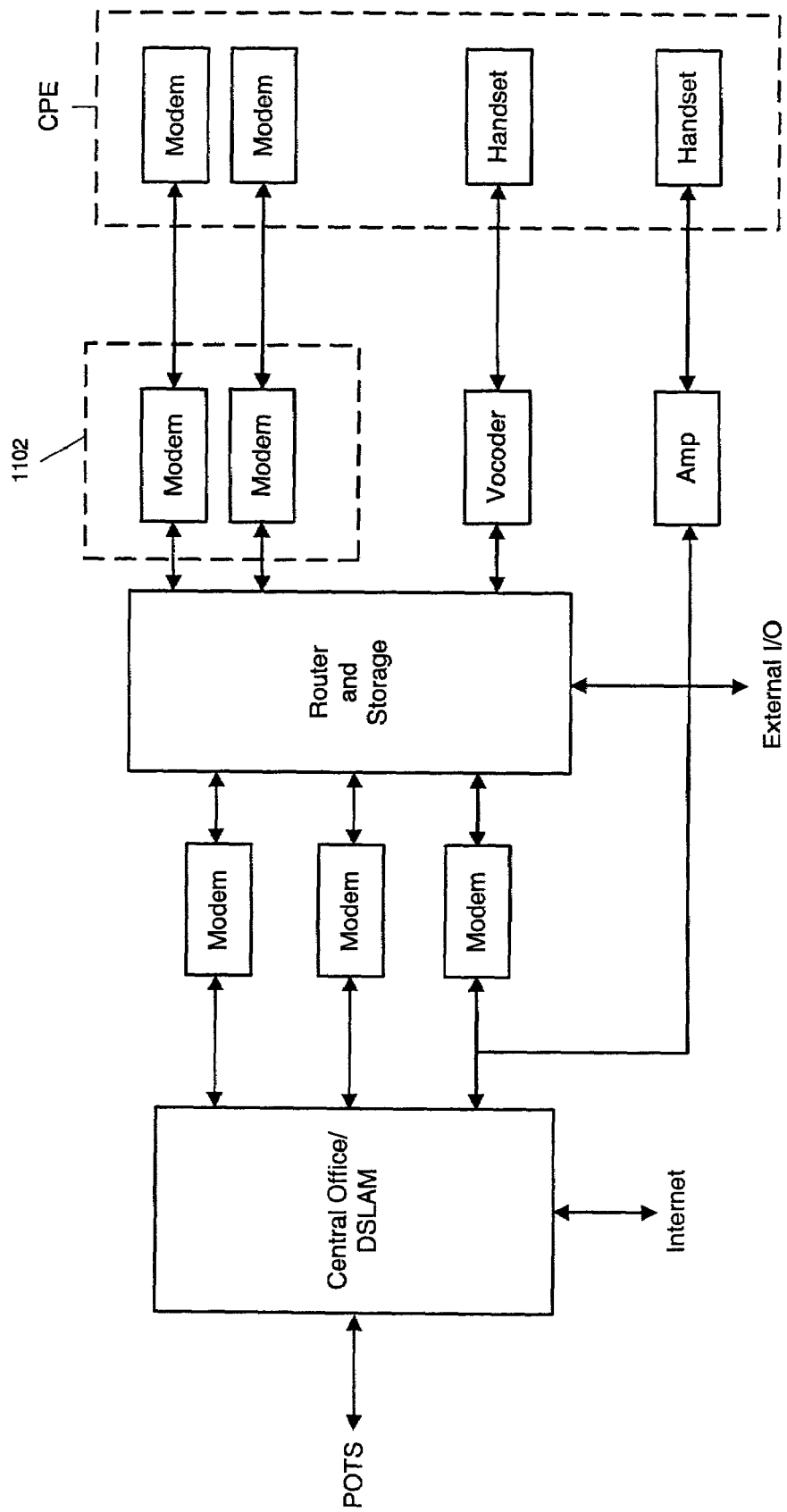
FIG. 11 is the enhanced data transfer system described in U.S. patent application "System for Enhancing Data Transfer", Inventor Michael Farmwald, Filing Date Sep. 13, 2001, application Ser. No. 09/951,351.

The systems described herein for oversubscribing a DSL modem can replace banks of modems used, for example, in a DSLAM. Additionally, the systems may replace the DSL modems of other systems employing banks of modems. For example, the modems 1102 of in FIG. 11, which is an enhanced data transfer system described in U.S. patent application "System for Enhancing Data Transfer", Inventor Michael Farmwald, Filing Date Sep. 13, 2001, application Ser. No. 09/951,351, can be replaced with any of the above, or equivalent, DSL switching systems.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A method for oversubscribing a group of M DSL modems comprising the steps of:
   (a) connecting the group of M DSL modems to a set of corresponding M customer premise equipment devices;

(b) connecting a group of P operation administration maintenance/embedded operations channel (OAM/EOC) modems to a set of corresponding P customer premise equipment devices;

(c) transferring user traffic data between the group of M DSL modems and the set of corresponding M customer premise equipment devices;

(d) transferring synchronization data between the group of P OAM/EOC modems and the set of corresponding P customer premise equipment devices; and (e) dynamically reconfiguring the connections to the set of corresponding M customer premise equipment devices and P customer premise equipment devices such that at least one device of the set of corresponding P customer premise equipment devices is connected to one DSL modem of the group of M DSL modems so the user traffic data is transferred between the at least one device of the set of corresponding P customer premise equipment devices and the one DSL modem of the group of M DSL modems, and such that at least one device of the set of corresponding M customer premise equipment devices is connected to one OAM/EOC modem of the group of P OAM/EOC modems so the at least one device of the set of corresponding M customer premise equipment devices remains in a state as if it was connected to a DSL modem.

2. The method of claim 1 further comprising the step of determining the sets of corresponding M and P customer premise equipment devices at least in part via request-to-send/clear-to-send (RTS/CTS) signals.

3. The method of claim 2 further comprising the step of embedding the RTS/CTS signals within superframes.

4. The method of claim 1 wherein a bandwidth requirements of the synchronization data is less than about 1 percent of a bandwidth requirement of the user traffic data.

5. The method of claim 1, further comprising the step of:
stopping the transfer of the user traffic data for a DSL modem of the group of M DSL modems connected to a customer premise equipment device of the set of corresponding M customer premise equipment devices when at least one of the following conditions is met: time-out, or no-more-data.

6. A system for oversubscribing a group of M DSL modems comprising:
an interface coupled between the group of M DSL modems and an upstream data link;
a group of P operation administration maintenance/embedded operations channel (OAM/EOC) modems in communication with the group of M DSL modems; and
a switch connected to a plurality of N downstream data links, the group of M DSL modems, and the group of P OAM/EOC modems, a first downstream data link of the plurality of N downstream data links being coupled to a first customer premise equipment device, wherein full data rate transmission is achieved such that user traffic data is transferred over the first downstream data link between the first customer premise equipment device and the upstream data link via one of the group of M DSL modems, and a second downstream data link of the plurality of N downstream data links being coupled to a second customer premise equipment device, wherein synchronization data is transferred over the second downstream data link between the second customer premise equipment device via one of the group of P OAM/EOC modems such that the second customer premise equipment device remains in a state as if connected to a DSL modem; and wherein the switch dynamically reconfigures customer premise equipment device connections such that at least one of the first and second customer premise equipment devices is connected to either one of the group of M DSL modems or to one of the group of P OAM/EOC modems.

7. The system of claim 6 further comprising means for communicating request-to-send/clear-to-send (RTS/CTS) signals between at least one of the first and second customer premise equipment devices and either one of the group of M DSL modems or one of the group of a P OAM/EOC modems.

8. The system of claim 6, wherein one or more of the plurality of N downstream data links comprises a POTS line.

9. The system of claim 6, wherein the upstream data link comprises: a POTS line, an optical fiber, a twisted pair conductor, a public switched telephone network, a T1 connection, a T3 connection, an ISDN connection, a coaxial cable, an SHDSL link, an ADSL link, a VDSL link, an HDSL link, a V.90 link, or an OCn link.

10. The system of claim 6, wherein M+P=N, and wherein P is at least 1.

11. A method for oversubscribing a group of M DSL modems, comprising the steps of:
(a) connecting a customer premise equipment device, according to the priority and order of a request from the customer premise equipment device, either to a one of the group of M DSL modems or to an one of a group of P operation administration maintenance/embedded operations channel (OAM/EOC) modems;

(b) transferring user traffic data for the customer premise equipment devices if the customer premise equipment device is connected to one of the group of M DSL modems;

(c) transferring synchronization data for the customer premise equipment device if the customer premise equipment device is connected to the one of the group of P OAM/EOC modems;

(d) determining whether a time-out or a no-more-data condition exists if the customer premise equipment device is connected to one of the group of M DSL modems; and (e) if the time-out or no-more-data condition exists, repeating steps (a)–(d), otherwise repeating steps (b)–(d).

12. The method of claim 11 wherein the connection of the customer premise equipment device to either the one of the group of M DSL modems or to the one of the group of P OAM/EOC modem is done at least in part in response to request-to-send/clear-to-send (RTS/CTS) signals.

13. The method of claim 12 further comprising the step of embedding the RTS/CTS signals within superframes.

14. The method of claim 11 wherein a bandwidth requirements of the synchronization data is less than about 1 percent of a bandwidth requirement of the user traffic data.

* * * * *